United States Patent Office 2,731,355
Patented Jan. 17, 1956

2,731,355

PROCESS OF PRODUCING A CRYSTALLINE MAGNESIUM-ALUMINUM-SILICATE MATERIAL

Kenneth G. Skinner, Norris, Tenn., assignor to the United States of America as represented by the Solicitor of the Department of the Interior No Drawing. Application September 11, 1952,
Serial No. 309,154

1 Claim. (Cl. 106—62)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention relates to magnesium-aluminum-silicate compositions and to methods of preparing the same, and more particularly, to compositions of this type having high crystalline cordierite development and to methods for producing these compositions.

The invention described in the present application is related to and constitutes an improvement over that described in the co-pending application of Wilson et al. Serial No. 309,153, filed September 11, 1952, now abandoned. Ownership of Serial No. 309,153 by mesne assignments is in the Department of Interior.

Cordierite is a rarely occurring natural magnesium-aluminum-silicate mineral having the theoretical formula $2MgO.2Al_2O_3.5SiO_2$ corresponding to a composition of 13.8% MgO, 34.9% $Al_2O_3$, and 51.3% $SiO_2$. The natural deposits are too impure and contain insufficient tonnage to be a commercial source of cordierite for ceramic bodies. Synthetic "cordierite" products heretofore produced by calcining mixtures of talc and clay or other aluminum silicates have been characterized by an impure composition containing only immature crystallization of cordierite and with thermal expansion coefficients higher than desirable.

An object of this invention is the production of a ceramic material having good electrical properties and a low thermal expansion.

Another object of this invention is the production of a magnesium-aluminum-silicate composition having low thermal expansion characteristics and high crystalline cordierite development.

A further object of this invention is the production of synthetic cordierite articles having good electrical characteristics, shock resistance, and low thermal expansion.

A still further object of this invention is to provide a process for producing cordierite compositions having a substantially constant chemical analysis.

Other objects and advantages of the invention will become apparent from the following description.

As disclosed in the aforementioned application, Serial No. 309,153, it has been determined that synthetic cordierite or cordierite solid solutions are formed in a small compositional area centered at 17% MgO, 30% $Al_2O_3$ and 53% $SiO_2$ and preferably extending less than 6% in any direction from this point, when materials containing these components in proportions within the given area are melted and properly treated.

The process of that invention comprises completely melting in a single stage operation materials containing magnesia, alumina, and silica in proportions to provide 10 to 30% MgO, 15 to 50% $Al_2O_3$ and 35 to 70% $SiO_2$, and treating the resulting composition under conditions promoting development of cordierite crystals.

The process of the present invention comprises producing a more highly developed crystalline cordierite material containing from 10–30% MgO, 15 to 50% $Al_2O_3$, and 35 to 70% $SiO_2$ in which, in the first stage, a melt is prepared of a material or materials providing a theoretical oxide composition selected from forsterite $$(2MgO.SiO_2)$$

and forsterite ($2MgO.SiO_2$) plus enstatite ($MgO.SiO_2$) compositions, iron is removed from the melt as ferrosilicon, if necessary, and in a second stage an aluminous material and siliceous material are added to supply the $Al_2O_3$ and $SiO_2$ required for the cordierite composition, a complete melt is again obtained, and the material is tapped and treated in such a manner as to secure maximum crystallization of cordierite.

The raw materials used in preparing the mixture and the preferred methods of manufcture will now be described.

A natural magnesium-containing rock or rocks is used to supply the MgO and from most rocks part of the $SiO_2$ for the composition desired in the final product. Such rocks include (a) olivine theoretically $2MgO.SiO_2$, but with a typical average composition of $$(1.3MgO.FeO).0.1Al_2O_3.SiO_2$$

(b) serpentine theoretically $3MgO.2SiO_2.2H_2O$, but with a typical average composition of $$(2.9MgO.0.1FeO).0.03Al_2O_3.2SiO_2.2H_2O$$

(c) talc theoretically $3MgO.4SiO_2.H_2O$, but with a typical average composition of $$(2.7MgO.0.1FeO.0.2CaO).01Al_2O_3.4SiO_2.1.3H_2O$$

and (d) brucite theoretically $MgO.H_2O$, but with a typical average composition of $(MgO.0.01FeO).H_2O$. The magnesium-containing materials having water of crystallization, such as serpentine and talc, are preferably added after they have been calcined, i. e., after the water has been removed by low temperature heating in which case the $H_2O$ would be deleted from the preceding formulas. The calcination aids in preventing splattering when the batch is being melted in subsequent operations.

An aluminous material is used to supply the necessary $Al_2O_3$, and with some materials such as kaolin, part of the $SiO_2$. The aluminous materials include (a) kaolin, theoretically $Al_2O_3.2SiO_2.2H_2O$, but with a typical average composition of $$0.9Al_2O_3.(0.02Fe_2O_3.0.05TiO_2).2SiO_2.1.8H_2O$$

(b) bauxite, theoretically $Al_2O_3.H_2O$ to $Al_2O_3.3H_2O$, but with a typical average composition of $$Al_2O_3.(0.06Fe_2O_3.0.07SiO_2).3.1H_2O$$

and (c) siliceous bauxite with a typical average composition of $Al_2O_3.(0.01Fe_2O_3.0.05TiO_2).0.08SiO_2.1.7H_2O$.

These aluminous materials are preferably added after they have been calcined, i. e., after the water has been removed by low temperature heating in which case the $H_2O$ would be deleted from the preceding formulas. The calcination aids in preventing splattering when the batch is being melted in subsequent operations.

Silica, $SiO_2$, if required to supply $SiO_2$ for the composition desired for the finished product is usually added as minus ½-inch crushed quartz. This silica would be an essential addition for a batch using such magnesium containing mineral as brucite.

If the raw materials in the batch contain appreciable amounts of iron, or iron compounds, carbonaceous material is added preferably as charcoal to assure chemically reducing conditions in subsequent melting operations. The reducing conditions are necessary to aid in removing iron impurities in the form of ferrosilicon.

According to one embodiment of the invention, magnesium containing raw material and siliceous material, such as the materials above described, are mixed and introduced as a charge to a suitable furnace, such as an electric arc furnace, in proportions to provide a melt essentially of a theoretical oxide composition selected from forsterite ($2MgO.SiO_2$) and forsterite ($2MgO.SiO_2$) plus enstatite ($MgO.SiO_2$) compositions. After complete melting of this charge, small amounts of iron, such as machine turnings, are added when necessary to increase the iron content of and consequently the specific gravity of any ferrosilicon which may be formed during the melting of the raw materials and to thereby facilitate its separation from the molten mass. The ferrosilicon separates out by gravity and may be recovered as a by-product. The magnesium-silicate melt forms a molten layer above any ferrosilicon present.

While the magnesium silicate is still molten, the second part of the charge which consists of aluminous material, such as the kaolin or bauxite of the composition given above, and silica if necessary to provide $SiO_2$ in addition to that melted with the MgO in the first stage, is added in proportions to provide a final composition of from 10 to 30 per cent MgO, 15 to 50 per cent $Al_2O_3$, and 35 to 70 per cent $SiO_2$. For lowest thermal expansion characteristics and highest crystalline cordierite development a composition of $3MgO.2Al_2O_3.6SiO_2$ corresponding to 17% MgO, 30% $Al_2O_3$, and 53% $SiO_2$ is preferred.

The charge with the added material is then again completely melted, and the resulting molten magnesium-aluminum-silicate melt, which is in the form of a layer above any ferrosilicon present is tapped, and cooled under controlled conditions for development of cordierite crystals. For example, the tapped material is cooled from a temperature of about 1475–1500° C. to 800° C. in not less than 8 hours, and to room temperature in not less than an additional four hours. The two stage operations in the above-described manner develops more complete cordierite crystallization in the product than by the single stage operation described in the aforementioned copending application in which all of the raw materials are added to the furnace at the same time and melted together. The increased crystallization is more pronounced for compositions of or near that of the preferred

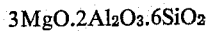

$3MgO.2Al_2O_3.6SiO_2$

In accordance with another embodiment of the invention, which develops the maximum degree of crystallization of the magnesium-aluminum-silicate product, a remelting operation is employed. The remelting operation comprises a two-stage process in which a synthetic magnesium-silicate of the approximate composition

$2MgO.SiO_2$ i. e. forsterite, free or practically free of iron impurities is first made and is then mixed and remelted with aluminous material in the necessary proportions for the final composition.

A suitable synthetic magnesium-silicate, or forsterite, having an average composition of

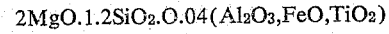

$2MgO.1.2SiO_2.0.04(Al_2O_3,FeO,TiO_2)$ but generally designated by the approximate formula $2MgO.SiO_2$, is produced by melting, tapping, and cooling a batch of natural or calcined magnesium-containing rock, such as those previously described and $SiO_2$ if necessary to provide the desired composition. Carbonaceous matter, such as charcoal, may be mixed with the batch to assure reducing conditions if iron impurities are present. Metallic iron may be added to the molten mass in order to increase the specific gravity of any ferrosilicon formed and thereby facilitate its removal. Essentially all of the iron, if present, should be removed as ferrosilicon during the melting operation.

Synthetic forsterite prepared by the method described in detail in the Journal American Ceramic Society, December 1943, vol. 26, No. 12, pages 405–413, or by the method described in U. S. Patent No. 2,418,026 may also be used in the remelt process to supply MgO and $SiO_2$.

The previously made synthetic magnesium-silicate or forsterite is thoroughly mixed with aluminous material, such as calcined kaolin or bauxite, and with silica in the form of quartz in proportions necessary to provide a composition within the range of 10–30% MgO, 15–50% $Al_2O_3$ and 35 to 70% $SiO_2$ as, for example, about 17% MgO, 30% $Al_2O_3$, and 53% $SiO_2$.

If the synthetic magnesium-silicate was not practically free of iron, or, if the batch materials contain appreciable amounts of iron, or iron compounds, carbonaceous material is again included with the charge to assure reducing conditions necessary to aid in removal of the iron as ferrosilicon.

The thoroughly mixed materials are now added as a charge to a suitable furnace, preferably an electric furnace of the submerged arc type. After complete melting, but before tapping small amounts of iron, such as machine turnings, are added when necessary to increase the iron content and consequently the specific gravity of ferrosilicon which may be formed during melting of the raw materials. Ferrosilicon separates out by gravity and may be recovered as a by-product.

After complete melting and separation of ferrosilicon the magnesium-aluminum-silicon melt is tapped and cooled under controlled conditions as in the case of the melt produced in the first embodiment of the invention. For example, the melt is cooled to 800° C. in not less than eight hours and to room temperature in not less than an additional four hours. This controlled cooling promotes development of crystalline material having a low mean thermal expansion coefficient less than $3.0 \times 10^{-6}$ cm./cm./° C. when reheated from 20° to 1000° C. Material produced by this method and of the preferred composition, about 17% MgO, 30% $Al_2O_3$, and 53% $SiO_2$, have maximum crystallization of cordierite and possess the lowest mean thermal expansion characteristics.

An alternate method of producing crystalline material from the melts produced in either of the above-described embodiments of the invention may also be employed. In this method, no attempt is made to control the cooling rate with the result that mostly glass, incipient crystalline, or cryptocrystalline materials are formed. Subsequent heating of the cooled material enmasse, or crushed or in fabricated ceramic parts develops well-defined crystals. This devitrification proceeds rapidly and completely during ceramic firing in contrast to the slow immature crystallization of raw talc and clay mixtures. A minimum devitrification temperature of 1100° C. is preferred.

The synthetic magnesium-aluminum-silicate, crystallized either by controlled cooling of the molten silicate or by subsequent devitrification by heat treatment, or while still in the form produced by rapid cooling may be fabricated by pressing, jiggering, slip-casting or extrusion followed by drying and firing to produce a ceramic ware or product. The magnesium-aluminum-silicate may be fabricated in this manner with or without addition of a suitable ceramic bonding material. For example, as a bonding material about 25% by weight of kaolin may be employed. An organic bond, such as gum arabic, may also be used to increase the dried strength of the unfired ware. The ceramic firing temperature of the synthetic cordierite material is about 1350° C. to 1450° C. depending on the composition and the degree of vitrification required.

The vitrification, as indicated by water absorption, of the fired product can be controlled by fabrication technique and firing temperature. For example, to obtain a vitrified product formed by dry-pressing, a composition of 50 per cent minus 100 mesh and 25 per cent minus 375-mesh crystalline magnesium-aluminum-silicate plus 25 per cent plastic kaolin is preferred. The kaolin acts as a ceramic bond. The fabricated ware is then dried and ceramically fired to the proper temperature for the composition employed. One such ware is fired to a temperature of 1450° C.

The fired ceramic ware is characterized by a low or even zero water absorption. The mean thermal expansion coefficient depends upon the composition of the magnesium-aluminum-silicate, and is usually less than $3.0 \times 10^{-6}$ cm./cm./° C. upon heating from 20° to 1000° C. Some of the fired products have slight shrinkages, slight expansions, or even zero expansion when in the range 20° C. to 600° C. In heating from 50° to 250° C. a contraction usually occurs which gives a negative coefficient but on heating to a higher temperature the product may and usually does expand with a corresponding change in the coefficient to a positive value. While a composition corresponding to the formula $$3MgO.2Al_2O_3.6SiO_2$$

is preferred for production of wares of lowest thermal expansion characteristics, the composition may be varied within the range given heretofore to produce products possessing properties which make them highly desirable for certain final usages. The thermal expansion and other characteristics of the product can be controlled by the composition of the crystalline material used in the fabrication.

By using the compositions, fabrication technique, and firing procedures described herein a low thermal expansion ceramic product is obtained which is superior to present "cordierite" type wares now in commercial use. The superior qualities may be attributed to the more highly developed crystalline structure, greater purity, and absence of CaO. These properties give a longer and higher safe firing temperature for complete vitrification without slumping, distortion or blistering.

It will be appreciated from a reading of the foregoing specification that the invention herein described is susceptible of various changes and modifications without departing from the spirit and scope thereof.

What is claimed is:

The process of producing a low thermal expansion highly crystalline cordierite ceramic material which comprises as a first stage melting natural magnesium containing rock of the class consisting of olivine, serpentine, talc and brucite, and containing natural impurities, mixed to produce a melt of magnesium silicate of the chemical composition corresponding to that of forsterite plus enstatite, and including in the melt sufficient iron to render it free from impurities, as a second stage adding natural aluminous material of the class consisting of kaolin, bauxite and silicious bauxite, together with silica to the molten magnesium silica at a temperature of at least 1475° C. in proportions to form a magnesium-aluminum-silicate melt of the chemical composition of cordierite, tapping the last mentioned melt and cooling it to about 800° C. in not less than about 8 hours, and then to room temperature in not less than about an additional 4 hours, whereby a highly crystalline cordierite ceramic material is formed having a low mean coefficient of thermal expansion of less than $3.0 \times 10^{-6}$ cm./cm./° C. When reheated to about 20° to 1000° C.

References Cited in the file of this patent

UNITED STATES PATENTS

| 2,036,190 | Benner et al. | Apr. 7, 1936 |
| 2,046,764 | Benner et al. | July 7, 1936 |

FOREIGN PATENTS

| 637,916 | Germany | 1936 |
| 605,237 | Germany | 1934 |
| 179,008 | Switzerland | 1935 |

OTHER REFERENCES

G. A. Rankin and H. E. Merwin: The Ternary System $MgO-Al_2O_3-SiO_2$ from the American Journal of Science, vol. XLV, April 1918, pages 301–325.